May 21, 1963

J. KERNOSKI 3,090,126

THREAD DIAL GAUGE

Filed Sept. 11, 1961

*INVENTOR.*
JOHN KERNOSKI

BY Knox & Knox

May 21, 1963  J. KERNOSKI  3,090,126
THREAD DIAL GAUGE
Filed Sept. 11, 1961  2 Sheets-Sheet 2
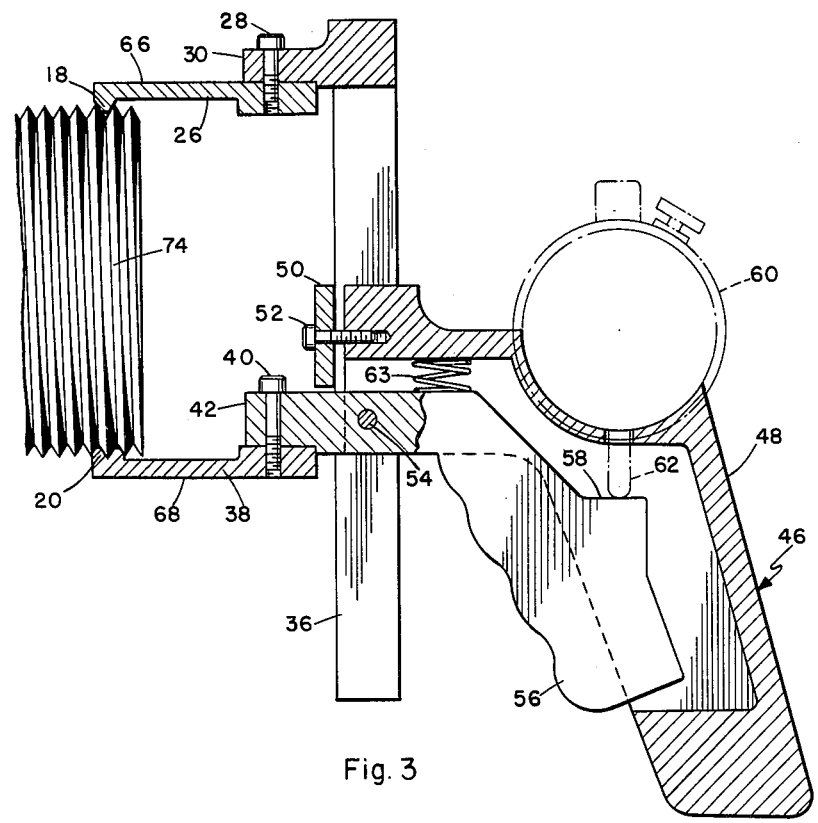
Fig. 3
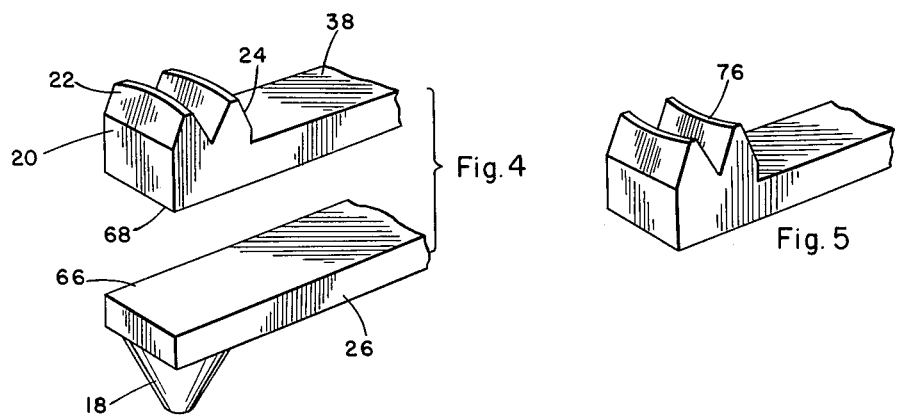
Fig. 4
Fig. 5
INVENTOR.
JOHN KERNOSKI
BY Knox & Knox

United States Patent Office 3,090,126
Patented May 21, 1963

3,090,126
THREAD DIAL GAUGE
John Kernoski, 5411 Gala Ave., San Diego, Calif.
Filed Sept. 11, 1961, Ser. No. 137,153
4 Claims. (Cl. 33—149)

This invention relates to measuring instruments, and more particularly to the measurement of the pitch diameter of a thread.

Background

Many mechanical devices have parts that must be assembled in a permanent, or in a separable manner; and one of the most widely used assembly means is the so-called "thread," which resembles a helical groove. One of the most common uses of the thread is the nut and bolt. The nut has threads, or grooves, on its inner surface, these being known as "internal" threads; while the bolt has threads, or grooves, on its outer surface, these being known as "external" threads.

Threads of the same general type are also used to couple pipes, and many other devices.

In order to fit together properly, the internal and external threads must mate; and much time, effort, and thought has gone into the standardization of threads. It will be realized that if the threads match well, there will be little or no relative movement, or play, between the parts. Thus, when the requirements are such that a good fit between parts is necessary, the worker who is cutting the threads in a piece of material must constantly check his work; and inspectors must do the same.

Since the size and shape of the threads are standardized the distance between diametrically opposite threads becomes important, and the term "pitch diameter" has assumed a technical significance that need not be explained here. Suffice it to say that this pitch diameter must be kept within prescribed limits to be satisfactory.

Objects and Drawings

It is therefore the principal object of my invention to provide an improved thread measuring device.

It is another object of my invention to provide an improved device for measuring the pitch diameter of a thread.

It is a further object of my invention to provide a pitch diameter measuring device that indicates whether the pitch diameter is correct, too large, or too small; and indicates the amount of deviation.

It is a still further object of my invention to provide a pitch diameter measuring device that is extremely accurate, and may be operated by one hand.

The attainment of these objects and others will be realized from the following specification, taken in conjunction with the drawings, of which:

FIGURE 3 is a sectional view taken on the line 3—3 of FIGURE 2, but showing the instrument arranged to measure an external thread;

FIGURE 4 is a perspective view of the tip portions of the measuring elements; and FIGURE 5 is a perspective view of an alternative measuring element.

Brief Description of the Invention

Broadly stated, my invention comprises a device having two-spaced apart measuring elements that are designed to fit into diametrically opposite portions of a thread. A pistol-grip type of arrangement permits easy entry of the measuring elements into the threads; and permits the measuring elements to seat themselves. A dial then indicates whether the measuring elements are too close or too far apart; and how much.

The position and orientation of the measuring elements may be changed, so that my invention may be used for internal or for external threads. Moreover, the measuring elements themselves are so shaped as to provide optimum meshing with the threads.

Detailed Description of the Invention

Figure 1:
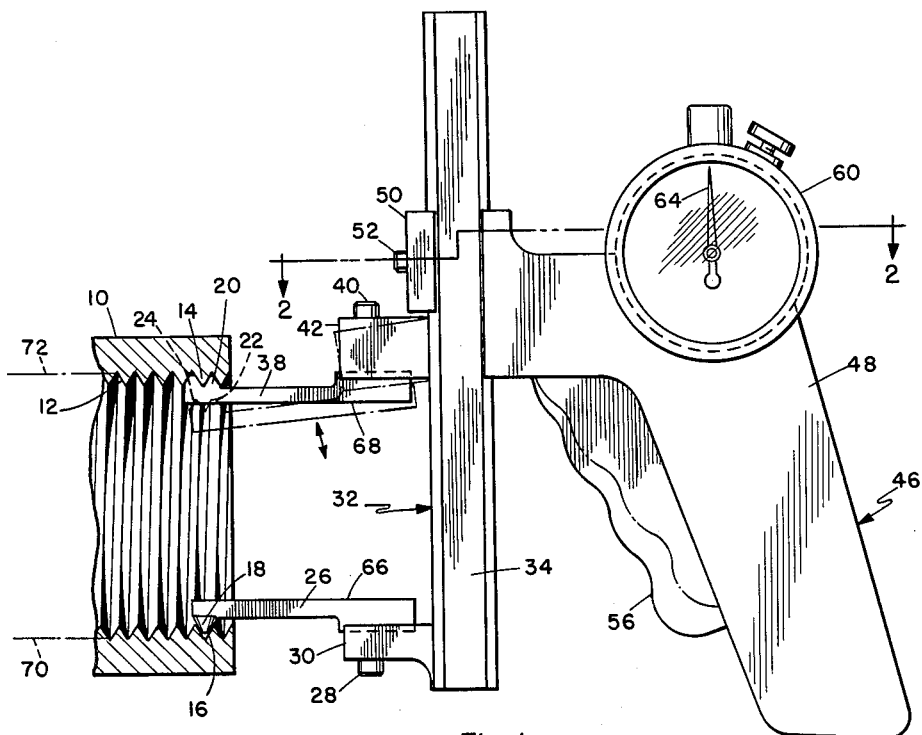
FIGURE 1 is a side elevation view of my invention, as used to measure an internal thread.
Figure 2:
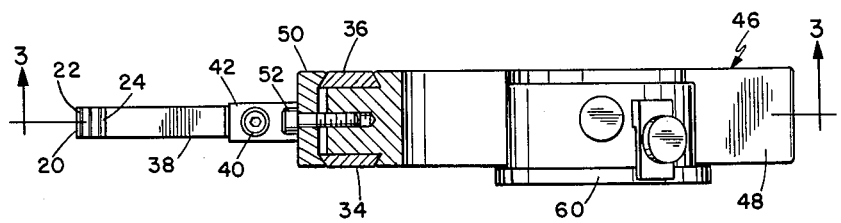
FIGURE 2 is a sectional view taken on the line 2—2 of FIGURE 1.

FIGURE 1 shows a partly cross sectional view of my invention in use on a collar 10 having internal threads 12. As will be realized, the threads are of a given size and depth, and have a standardized shape, usually 60 degrees. Due to the inherent design of the threads, each crest thereof has a trough diametrically opposite it. Thus crest 14 is opposite trough 16.

I use a first "feeler" or measuring element 18 that conveniently takes the form of a cone having sides at an angle of 60 degrees. Due to the use of this angle, feeler 18 fits snugly into trough 16. To assure an even better fit, the tip of feeler 18 is flattened, so that it will not "bottom" in trough 16.

I use a second feeler 20 whose cross section is substantially M-shaped, the center of the M also being at an angle of 60 degrees. This angle assures that feeler 20 will seat itself onto crest 14; and to assure an even better seating, the tops of the M are flattened off, and the sides 22–44 have an angle that prevents them from unduly contacting the sides of adjacent crests of thread 12. Moreover, as shown in FIGURE 4, feeler 20 has the upper engaging portions thereof arcuately convex, so that it may mesh more completely with thread 12.

In this way, feelers 18 and 20 automatically seat themselves at diametrically opposite portions of the internal thread 12 of collar 10.

In order to measure the distance between feelers 18 and 20, I use the apparatus shown in FIGURE 1. Feeler 18 is attached to, or integrated with, a first arm 26 that is fastened by some means, such as a set-screw 28 and a bracket 30 to one end of a slide 32, which may comprise a pair of parallel trapezoidally cross sectioned guide bars 34 and 36.

Second feeler 20 is attached to, or integral with, a second arm 38 that is fastened by some means, such as a set-screw 40 to a lever 42.

In order to vary the spacing between feelers 18 and 20 I use a pistol-type handle 46. This comprises a frame 48 upon which is slidably fastened slider 32. One way to achieve this result is to use a clamping plate 50 and a single locking screw 52. Once the frame 48 is suitably positioned, locking screw 52, clamping plate 50, and frame 48 clamp to edges of the guide bars 34, 36, and maintains this spatial relation between frame 48 and slider 32.

Lever 42 is pivoted to frame 48 by means of a pivot pin 54; and the distal end of lever 42 is shaped to form a trigger 56. I have found that a trigger actuated by the fingers is more satisfactory than one actuated by the thumb. An actuating bar 58 is part of trigger 56 and a dial indicator 60 has its actuating pin 62 resting on actuating bar 58.

Most dial indicators have biassing means, such as internal springs, that position actuating pin 62 at one end of its travel. If desired, the inherent biassing means may be used to eject the trigger 56, or a helper spring such as 63 may be used.

As is well known, dial indicators, such as that indicated by reference character 60, have a pointer 64 whose position changes in correspondence with the in-out movement of actuating pin 62. As pin 62 moves into dial indicator 60, a linkage causes pointer 64 to move across a graduated scale, and pointer 64 thus shows how far actuating pin 62 has moved. The graduated scale of dial indicator 60 is usually rotatable, so that any given position of actuator pin 62, and thus pointer 64, may represent the zero position. Thus, if actuator pin moves further inward, pointer 64 will rotate to one part of the scale. Similarly, if actuator pin moves outward, pointer 64 will rotate to the opposite side of the scale.

*Operation of the Invention*

My device is used as follows: A standard collar having correctly cut threads is used. Trigger 56 is retracted, causing lever 42 to pivot about pin 54 and lower the second feeler 20. The two feelers are then inserted into the standard collar, and the trigger is released. This action allows feeler 20 to rise until it seats on the crest of the thread, while feeler 18 seats in the trough of the thread. If desired, the handle 46 is twisted slightly from side to side to assure better seating. When feelers 18 and 20 are properly meshed in the thread, actuating bar 58 assumes a given position, which in turn causes actuating pin 62 and pointer 64 to assume given positions. The scale of dial indicator 60 is then rotated so that pointer 64 indicates zero. The device is now in a "calibrated" state.

The trigger is now retracted, causing the feelers to approach each other and disengage themselves from the thread; whereupon they are withdrawn from the collar. In the manner previously described, the feelers are inserted into the collar to be tested. If this collar is exactly the same as the standard one, pointer 64 will again indicate zero. Should the test collar be larger or smaller, pointer 64 will indicate which, and its position on the scale will also show how much larger or smaller.

In order to be direct reading, the distance from feeler 20 to pivot 54 should equal the distance from pivot 54 to actuator pin 62.

It is not necessary to have a standard collar to use my device. Surfaces 66 and 68 of arms 26 and 38 respectively, are finished in such a way that each is a definite distance, such as a quarter of an inch, from the pitch diameter lines 70, 72, of their respective feelers.

Thus, if the pitch diameter should be, say 2 inches, a gauge block of 1½ inches dimension is positioned between surfaces 66 and 68. The trigger 56 is then retracted as far as possible, and the scale is set to indicate zero for that pointer position. Once the instrument has been thus calibrated in this manner, it is used as previously described.

When a smaller pitch diameter is to be measured, locking screw 52 is loosened, and clamp plate 50 permits the slider 32 to move upwards relative to lever 42. At the desired position, the lock screw and clamp are tightened.

As may be realized, a number of different feelers may be required to measure different threads; although I have found that three feelers cover the entire range of threads in common use. To replace the feelers, set screws 28 and 40 are loosened, and new feelers and arms may be substituted.

It is frequently desirable to measure external threads, and my device can be used for this purpose as shown in FIGURE 3. Here the slider 32 has been inverted and feeler 18 reversed, so that feelers 18 and 20 point toward each other, and thus fit into the threads of an externally threaded member 74. The device is now used as previously described, except that trigger 56 is retracted to obtain the reading, rather than being released as described above.

In the arrangement of FIGURE 3, the flat finished surfaces 66 and 68 are now outermost, so a micrometer or an outside caliper can be used for calibrating the device. The above mentioned ½ inch dimension is used as previously described in setting the micrometer for the pitch diameter.

In measuring the pitch diameter of an externally threaded member, such as 74, it may be desirable to replace feeler 20 with a feeler 76 that is arcuately concave, as shown in FIGURE 5, in order to assure better meshing of the feeler and threads.

If it is desired to obtain the reading when the trigger is released, the pistol grip can be inverted, and the feelers properly oriented to obtain the desired result.

Obtaining the reading when the trigger is released has the advantage that the pressure between the thread-meshing elements and the thread itself is constant, and is established by the spring 63 rather than by finger pressure on the trigger.

It is understood that minor variation from the form of the invention disclosed herein may be made without departure from the spirit and scope of the invention, and that the specification and drawing are to be considered as merely illustrative rather than limiting.

I claim:

1. A device for checking the pitch diameter of internal and external threads that have diametrically oppositely positioned crests and troughs having sides sloped at a given angle, comprising in combination:
   a slider comprising a pair of spaced apart parallel guide bars of trapezoidal cross section;
   a bracket mounted between said bars at one end of it to space said bars apart;
   a first invertably positionable arm mounted on said bracket;
   a first thread-meshing element mounted at the end of said first arm, said element comprising a cone having its sides at said given angle, and having its top flattened off, whereby said conical thread meshing element will fit snugly into a trough of said thread without bottoming therein;
   a pistol-grip arrangement having a frame having grooves that space and guide said guide bars;
   a clamp plate having grooves that space and guide said guide bars;
   a single locking screw means for locking together said clamp plate, said guide bars, and said frame;
   a finger trigger pivotally mounted on said frame and enclosed by said pistol-grip arrangement, said trigger having convolutions for fitting at least one finger of the hand, said trigger terminating in a lever at the other end thereof, and carrying an actuating bar adjacent said trigger end;
   a second invertably positionable arm mounted on said lever;
   a second thread-meshing element mounted at the end of said second arm, said second element comprising a sloping side structure whose inner surfaces are at said given angle to mesh with the crest of said thread, and whose outer surfaces are at an angle not to unduly mesh with said thread, the upper portion of said structure being flattened to prevent bottoming in said thread, said second thread-meshing element being arcuate to better mesh with the crest of said thread, whereby said thread-meshing elements may be positioned to mesh with internal and external threads, and said second element may have a limited movement controlled by the movement of said trigger;
   a dial indicator having an actuating pin; and means for mounting said indicator on said frame with said actuating pin in contact with said actuating bar of said trigger.

2. A device for checking the pitch diameter of internal and external threads that have diametrically oppositely positioned crests and troughs having sides sloped at an angle of 60 degrees, comprising in combination:
   a slider comprising a pair of spaced apart parallel guide bars of trapezoidal cross section;
   a bracket mounted between said bars at one end to space said bars apart;
   a first invertably positionable arm mounted on said bracket;

a first thread-meshing element mounted at the end of said first arm, said element comprising a cone having its sides at an angle of 60 degrees and having its top flattened off, whereby said conical thread meshing element will fit snugly into a trough of said thread without bottoming therein, said arm having a flat surface positioned one quarter of an inch from the pitch line of said first thread-matching element;

a pistol-grip arrangement having a frame having grooves that space and guide said guide bars;

a clamp plate having grooves that space and guide said guide bars;

a single locking screw means for locking together said clamp plate, the edges of said guide bars, and said frame;

a finger trigger pivotally mounted on said frame, said trigger having convolutions for fitting at least one finger of the hand, said trigger terminating in a lever at the other end thereof, and carrying an actuating bar, separate from said lever, and adjacent said trigger end;

a second invertably positionable arm mounted on said lever;

a second thread-meshing element mounted at the end of said second arm, said second element comprising an M-shaped structure whose inner surfaces are at an angle of 60 degrees to mesh with the crest of said thread, and whose outer surfaces are at an angle such as, not to unduly mesh with said thread, the upper portion of said M being flattened to prevent bottoming in said thread, said second thread-meshing element being arcuate to better mesh with the crest of said thread, whereby said thread-meshing elements may be positioned to mesh with internal and external threads, and said second element may have a limited movement controlled by the movement of said trigger, said second arm having a flat surface positioned one quarter of an inch from the pitch line of said second thread-matching element;

a dial indicator having an actuating pin; and means for mounting said indicator on said frame with said actuating pin in contact with said actuating bar of said trigger.

3. The combination of claim 2 wherein said second thread-meshing element is arcuately convex to better match internal threads.

4. The combination of claim 2 wherein said second thread-meshing element is arcuately concave to better match external threads.

References Cited in the file of this patent

UNITED STATES PATENTS

| | | |
|---|---|---|
| 1,248,174 | Schwartzman et al. | Nov. 27, 1917 |
| 1,950,912 | Aronson | Mar. 13, 1934 |
| 2,427,924 | Rose | Sept. 23, 1947 |
| 2,440,967 | Moore | May 4, 1948 |
| 2,448,106 | Mannerbrink et al. | Aug. 31, 1948 |
| 2,802,273 | Mueller | Aug. 13, 1957 |
| 2,807,091 | Michelson | Sept. 24, 1957 |
| 2,826,822 | Noviant | Mar. 18, 1958 |